US010567671B2

(12) United States Patent
Ono

(10) Patent No.: US 10,567,671 B2
(45) Date of Patent: Feb. 18, 2020

(54) IMAGE PROCESSING APPARATUS AND IMAGE PROCESSING METHOD

(71) Applicant: SONY CORPORATION, Tokyo (JP)

(72) Inventor: Yuki Ono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 150 days.

(21) Appl. No.: 15/124,411

(22) PCT Filed: Mar. 6, 2015

(86) PCT No.: PCT/JP2015/056595
§ 371 (c)(1),
(2) Date: Sep. 8, 2016

(87) PCT Pub. No.: WO2015/141487
PCT Pub. Date: Sep. 24, 2015

(65) Prior Publication Data
US 2017/0019608 A1    Jan. 19, 2017

(30) Foreign Application Priority Data
Mar. 18, 2014   (JP) ................................ 2014-054627

(51) Int. Cl.
*H04N 5/243*   (2006.01)
*H04N 5/235*   (2006.01)
(Continued)

(52) U.S. Cl.
CPC ............. *H04N 5/243* (2013.01); *G06T 5/004* (2013.01); *G06T 5/50* (2013.01); *H04N 5/2356* (2013.01);
(Continued)

(58) Field of Classification Search
CPC .. H04N 5/243; H04N 5/23216; H04N 5/2356; H04N 5/23229; H04N 5/23254; G06T 5/004; G06T 5/50
See application file for complete search history.

(56) References Cited

U.S. PATENT DOCUMENTS 6,693,962 B1 * 2/2004 Murching .............. H04N 19/23
375/240.08
7,391,907 B1 * 6/2008 Venetianer ......... G06K 9/00771
382/103
(Continued)

FOREIGN PATENT DOCUMENTS

EP        2242021 A1    10/2010
JP     10-243288 A      9/1998
(Continued)

OTHER PUBLICATIONS

Youm S-J et al ("High Dynamic Range Video through Fusion of Exposure-Controlled Frames", Proceedings of the Ninth Conference on Machine Vision Applications: May 16-18, 2005, Tsukuba Science City, Japan, The University of Tokyo, Tokyo, JP, May 16, 2005 (Year: 2005).*

(Continued)

*Primary Examiner* — Abdelaaziz Tissire
(74) *Attorney, Agent, or Firm* — Chip Law Group

(57) ABSTRACT

The present disclosure relates to an image processing apparatus, an image processing method, and a program therefor with which slow shutter photographing can be performed with ease. An image gradient extraction unit extracts image gradient components in an object movement direction from a long-exposure image out of input images. An initial label map generation unit generates an initial label map based on a gradient extraction result from the image gradient extraction unit. A foreground extraction unit extracts a foreground from the input images based on the label map from the initial (Continued)

label map generation unit or label map update unit to generate a synthesis mask. The present disclosure is applicable to, for example, an image pickup apparatus including an image processing function.

9 Claims, 16 Drawing Sheets

(51) Int. Cl.
*H04N 5/232* (2006.01)
*G06T 5/50* (2006.01)
*G06T 5/00* (2006.01)

(52) U.S. Cl.
CPC ..... *H04N 5/23216* (2013.01); *H04N 5/23229* (2013.01); *H04N 5/23254* (2013.01); *G06T 2207/10144* (2013.01); *G06T 2207/20221* (2013.01)

(56) References Cited

U.S. PATENT DOCUMENTS

| | | | | |
|---|---|---|---|---|
| 2003/0112341 | A1* | 6/2003 | Aoki | H04N 1/407 348/223.1 |
| 2004/0095557 | A1* | 5/2004 | Yamada | H04N 5/145 352/39 |
| 2004/0136603 | A1* | 7/2004 | Vitsnudel | G06T 5/004 382/254 |
| 2005/0275723 | A1* | 12/2005 | Sablak | G06K 9/00771 348/169 |
| 2006/0203098 | A1* | 9/2006 | Henninger, III | G06K 9/00771 348/211.99 |
| 2010/0053346 | A1* | 3/2010 | Mitsunaga | H04N 5/23248 348/208.6 |
| 2010/0177208 | A1* | 7/2010 | Tamaru | H04N 5/145 348/222.1 |
| 2010/0183245 | A1* | 7/2010 | Oryoji | G06T 3/4053 382/299 |
| 2012/0051638 | A1* | 3/2012 | Kawai | G06K 9/3241 382/170 |
| 2012/0194686 | A1* | 8/2012 | Lin | H04N 5/2355 348/208.4 |
| 2014/0307044 | A1* | 10/2014 | Sharma | H04N 5/23229 348/36 |
| 2016/0292837 | A1* | 10/2016 | Lakemond | G06T 5/002 |
| 2017/0024920 | A1* | 1/2017 | Zhang | G06T 7/00 |
| 2017/0236288 | A1* | 8/2017 | Sundaresan | G06T 7/0081 382/173 |
| 2018/0061027 | A1* | 3/2018 | Lakemond | G06T 5/007 |

FOREIGN PATENT DOCUMENTS

| | | |
|---|---|---|
| JP | 2000-050173 A | 2/2000 |
| JP | 2010-136239 A | 6/2010 |
| JP | 2011-114823 A | 6/2011 |
| JP | 2012-083848 A | 4/2012 |
| JP | 2013-243780 A | 12/2013 |
| WO | 2012/166044 A1 | 12/2012 |
| WO | 2013/094212 A | 6/2013 |
| WO | 2013/094212 A1 | 6/2013 |

OTHER PUBLICATIONS

Kim D et al. ("Automatic moving object segmentation using histogrambased graph cut and label maps", Electronics LET, IEE-Stevenage, GB, vol. 48, No. 19, Sep. 13, 2012 (Sep. 13, 2012), pp. 1198-1199 (Year: 2012).*
Extended European Search Report of EP Patent Application No. 15764144.0, dated Jul. 27, 2017, 10 pages.
Youm, et al., "High Dynamic Range Video through Fusion of Exposure-Controlled Frames", XP-002562045, MVA2005 IAPR Conference on Machine Vision Applications, May 16-18, 2005 Tsukuba Science City, Japan, pp. 546-549.
Kim, et al., "Automatic Moving Object Segmentation Using Histogram-Based Graph Cut and Label Maps", Electronics Letters, vol. 48, No. 19, Sep. 13, 2012, pp. 02.

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2015/056595 filed on Mar. 6, 2015, which claims priority benefit of Japanese Patent Application No. 2014-054627 filed in the Japan Patent Office on Mar. 18, 2014. Each of the above-referenced applications is hereby incorporated herein by reference in its entirety.

TECHNICAL FIELD

The present disclosure relates to an image processing apparatus, an image processing method, and a program therefor, more particularly, to an image processing apparatus, an image processing method, and a program therefor with which slow shutter photographing can be performed with ease.

BACKGROUND ART

While it is possible to perform slow shutter photographing in which trajectories of light, water flows, and movements of objects are recorded by lowering a shutter speed, there has been a need to fix image pickup apparatuses such as a camera using tripods or the like for preventing blurring during exposure. Consequently, time and effort had been necessary for users due to loads of carrying and setting tripods, restrictions on compositions, and the like.

In this regard, for example, Patent Document 1 proposes a method of consecutively photographing images having a short exposure time and synthesizing those images to obtain a quasi-slow shutter effect. In this method, however, movements of objects cannot be captured when the shutter is shut, and thus the synthetic image has been unnatural.

Patent Document 1: Japanese Patent Application Laid-open No. 2012-83848

SUMMARY OF INVENTION

Problem to be Solved by the Invention

As described above, the method of easily performing slow shutter photographing is not yet established, and such a method is required to be established as quickly as possible in recent years.

The present disclosure has been made in view of the circumstances as described above and aims at enabling slow shutter photographing to be performed with ease.

Means for Solving the Problem

According to an embodiment of the present disclosure, there is provided an image processing apparatus including: a mask generation unit that generates a synthesis mask based on information on a specific direction of a long-exposure image out of a plurality of consecutively-photographed images having different exposure times; and an image synthesis unit that synthesizes the plurality of images using the synthesis mask generated by the mask generation unit.

According to an embodiment of the present disclosure, there is provided an image processing method including: generating, by an image processing apparatus, a synthesis mask based on information on a specific direction of a long-exposure image out of a plurality of consecutively-photographed images having different exposure times; and synthesizing, by the image processing apparatus, the plurality of images using the generated synthesis mask.

According to an embodiment of the present disclosure, there is provided a program that causes a computer to function as: a mask generation unit that generates a synthesis mask based on information on a specific direction of a long-exposure image out of a plurality of consecutively-photographed images having different exposure times; and an image synthesis unit that synthesizes the plurality of images using the synthesis mask generated by the mask generation unit.

In the embodiment of the present disclosure, the synthesis mask is generated based on the information on the specific direction of the long-exposure image out of the plurality of consecutively-photographed images having different exposure times. Then, the plurality of images are synthesized using the generated synthesis mask.

Effects of the Invention

According to the present disclosure, slow shutter photographing can be performed, more particularly, according to the present disclosure, slow shutter photographing can be performed with ease.

It should be noted that the effects described herein are not necessarily limited, and any effect described in the present disclosure may be obtained.

MODES FOR CARRYING OUT THE INVENTION

Hereinafter, configurations for embodying the present disclosure (hereinafter, referred to as embodiments) will be described. It should be noted that the descriptions will be given in the following order.
0. General outline
1. First embodiment (image pickup apparatus)
2. Second embodiment (computer)

0. General Outline (General Outline of Present Technique)

Slow shutter photographing under a situation where there is no fixing means such as a tripod is apt to be influenced by a stir of a background or moving bodies excluding an object, that is due to a stir of a camera body. Such a stir equally influences the entire image, but from eyes of human beings, influences on areas including backgrounds, people, and the like that are originally considered to be static may seem larger than influences on an object such as a light trajectory, water flow, and movement of a physical body that a user wishes to photograph in a slow shutter mode (hereinafter, simply referred to as object).

In this regard, in the present technique, a plurality of images having different exposure times (hereinafter, of those images, an image having a longest exposure time will be referred to as long-exposure image, and other images will be referred to as short-exposure images) are taken, an object is detected from the long-exposure image, and a synthesis mask is generated. Then, based on the synthesis mask, a long-exposure image is used for an area to be expressed in slow shutter, and short-exposure images are used for the background areas excluding the object, and the images are synthesized. It should be noted that, of the images to be used for the synthesis, an image having a longer exposure time than an image having the shortest exposure time can be used as the long-exposure image.

Accordingly, the user can perform slow shutter photographing while stirs of a camera body are suppressed under a situation where there is no fixing means such as a tripod. In other words, a high-quality image can be obtained by the slow shutter photographing (hereinafter, also referred to as slow shutter image).

Hereinafter, the present technique described above will be described in detail.

1. First Embodiment (Structural Example of Image Pickup Apparatus to which Present Technique is Applied)

Figure 1:
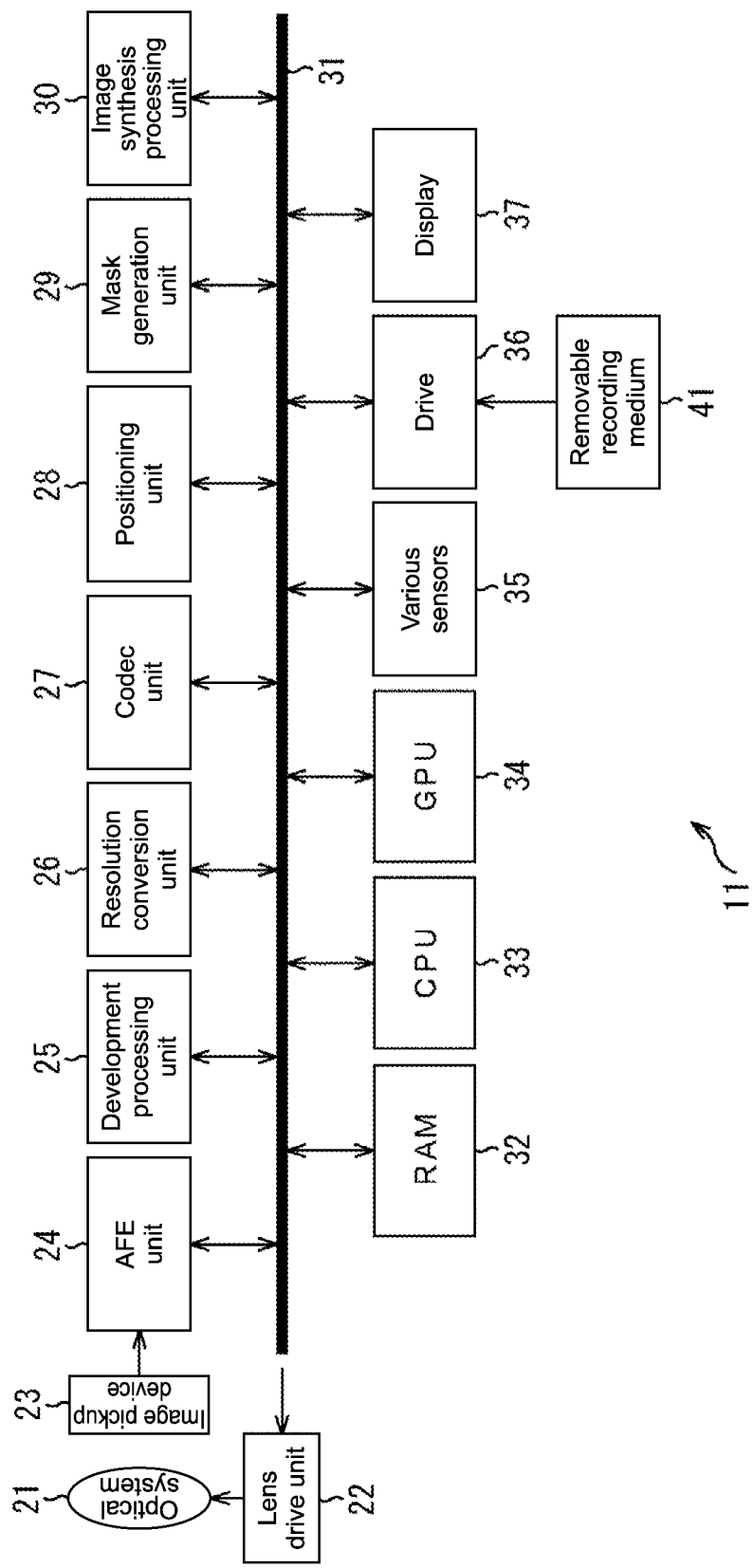
FIG. 1 A block diagram showing a structural example of an image pickup apparatus to which the present disclosure is applied.

FIG. 1 is a block diagram showing an embodiment of an image pickup apparatus to which the image processing apparatus of the present technique is applied. It should be noted that the respective units shown in FIG. 1 may each be constituted of a circuit.

The image pickup apparatus 11 shown in FIG. 1 is constituted of, as a photographing system, an optical system 21 such as a lens, a lens drive unit 22, an image pickup device 23, an AFE (Analog Front End) unit 24, a development processing unit 25, a resolution conversion unit 26, a codec unit 27, a positioning unit 28, a mask generation unit 29, and an image synthesis processing unit 30. The image pickup apparatus 11 is also constituted of a bus 31, a RAM (Random Access Memory) 32, a CPU (Central Processing Unit) 33, a GPU (Graphics Processing Unit) 34, various sensors 35, an image recording/reading drive 36 into which a removable recording medium 41 is inserted, and a display 37.

It should be noted that the units within the ranges of the AFE unit 24 to the image synthesis processing unit 30 and the RAM 32 to the display 37 are mutually connected via the bus 31.

Further, the AFE unit 24, the development processing unit 25, the resolution conversion unit 26, and the codec unit 27 are constituted of a digital signal processing LSI (Large Scale Integration) capable of consecutively photographing two or more images. Moreover, although FIG. 1 shows an example where the photographing system and the processing system are integrated, those systems may be provided separate from each other.

Light photographed by the optical system 21 is collected on the image pickup device 23 and output as image signals to the AFE unit 24.

The AFE unit 24 is constituted of a semiconductor chip such as an amplifier, an A/D converter, and a filter. The AFE unit 24 adjusts image signals from the image pickup device 23, converts the signals into digital data, and supplies the data to the development processing unit 25.

The development processing unit 25 carries out signal processing such as de-mosaic processing on the image data from the AFE unit 24. While a slow shutter function is being executed, the development processing unit 25 supplies the image data that has been subjected to the signal processing to the positioning unit 28. While functions other than the slow shutter function are being executed, the development processing unit 25 supplies the image data that has been subjected to the signal processing to the resolution conversion unit 26.

The resolution conversion unit 26 converts resolution of the image data from the development processing unit 25 or the image synthesis processing unit 30 and then supplies the data to the codec unit 27.

For recording the image data from the resolution conversion unit 26, the codec unit 27 carries out encoding processing on the image data and supplies the encoded data that has been subjected to the encoding processing to, for example, the drive 36. The codec unit 27 also decodes the encoded data read out from the drive 36 and supplies the decoded image data to the positioning unit 28.

The positioning unit 28 positions a plurality of images from the development processing unit 25 or the codec unit 27 and supplies the positioned image data to the mask generation unit 29 and the image synthesis processing unit 30.

Of the plurality of images positioned by the positioning unit 28, the mask generation unit 29 uses a long-second (long) exposure image to generate a synthesis mask and supplies the generated synthesis mask to the image synthesis processing unit 30.

The image synthesis processing unit 30 uses the synthesis mask from the mask generation unit 29 to synthesize the positioned image data from the positioning unit 28, and thus generates a slow shutter image. The generated slow shutter image is supplied to, for example, the resolution conversion unit 26. The generated slow shutter image may also be supplied to the codec unit 27 or the drive 36.

The RAM 32 temporarily stores programs and data. The CPU 33 loads and executes programs stored in the removable recording medium 41 or a storage unit (not shown) in the RAM 32 via the bus 31, for example, to carry out predetermined processing. The CPU 33 controls the lens drive unit 22 and the optical system 21 to carry out photographing processing, image processing, and display processing of UIs and the like, for example.

The GPU 34 carries out calculation processing requisite for displaying 3D graphics. The various sensors 35 include a distance measurement sensor, a brightness sensor, and the like that are requisite for the camera function, for example.

The drive 36 records encoded data from the codec unit 27 onto the removable recording medium 41, or reads out encoded data from the removable recording medium 41 and supplies the data to the codec unit 27. The removable recording medium 41 is constituted of a magnetic disk, an optical disc, a magneto-optical disc, a semiconductor memory, or the like.

The display 37 is constituted of an LCD (Liquid Crystal Display) or the like and displays data and images from the respective units.

(Functional Structural Example of Image Pickup Apparatus)

Figure 2:
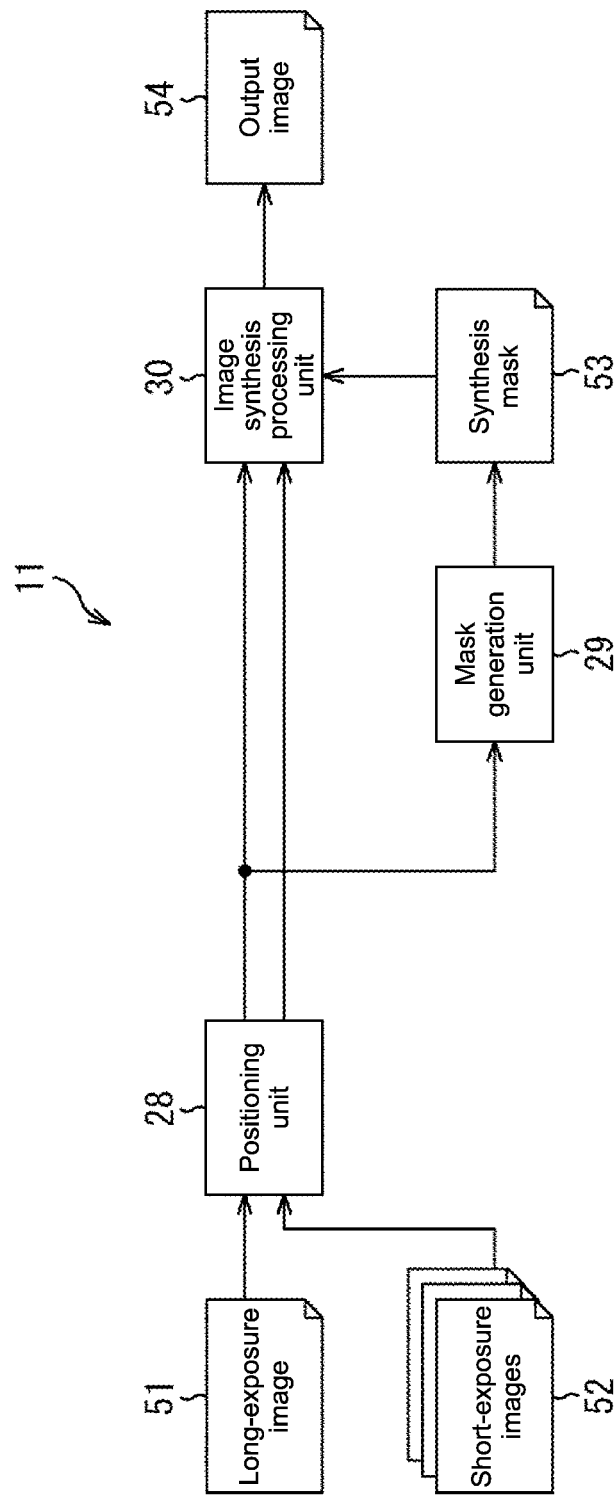
FIG. 2 A block diagram showing a functional structural example of the image pickup apparatus.

FIG. 2 shows a functional structural example of the image pickup apparatus. It should be noted that FIG. 2 shows a minimum structural example.

As shown in FIG. 2, the image pickup apparatus 11 is structured to include the positioning unit 28, the mask generation unit 29, and the image synthesis processing unit 30.

Input to the positioning unit 28 are a long-exposure image 51 and short-exposure images 52 that have been subjected to the signal processing by the development processing unit 25. Since a situation where the image pickup apparatus 11 is not fixed by a tripod is assumed, there is a need to perform positioning among the photographed images.

It should be noted that the short-exposure images 52 may either be a plurality of images or a single image. In the case of a plurality of images, images of a higher quality can be used by photographing images while changing an exposure amount, for example. Moreover, in the case of a night view, noises can be reduced by superimposing short-exposure images.

The positioning unit 28 positions the input images. Examples of the positioning method include a method that uses block matching and a method of calculating a nomography matrix by detecting feature points.

The positioning unit 28 supplies the positioned long-exposure image 51 and short-exposure images 52 to the image synthesis processing unit 30. The positioning unit 28 also supplies the positioned long-exposure image 51 to the mask generation unit 29.

Using the positioned long-exposure image 51, the mask generation unit 29 generates a mask 53 used for synthesizing the long-exposure image 51 and the short-exposure images 52 (hereinafter, referred to as synthesis mask). The mask generation unit 29 supplies the generated synthesis mask 53 to the image synthesis processing unit 30. The synthesis mask 53 indicates an object area to be photographed in slow shutter and areas excluding the object area.

Based on the synthesis mask 53 supplied from the mask generation unit 29, the image synthesis processing unit 30 synthesizes the positioned long-exposure image 51 and short-exposure images 52 and obtains an output image 54. For example, the long-exposure image 51 and the short-exposure images 52 are α-blended. At this time, by gradually changing a blending ratio near the boundary of the synthesis mask 53, the boundary can be made obscure.

(Structural Example of Mask Generation Unit)

Figure 3:
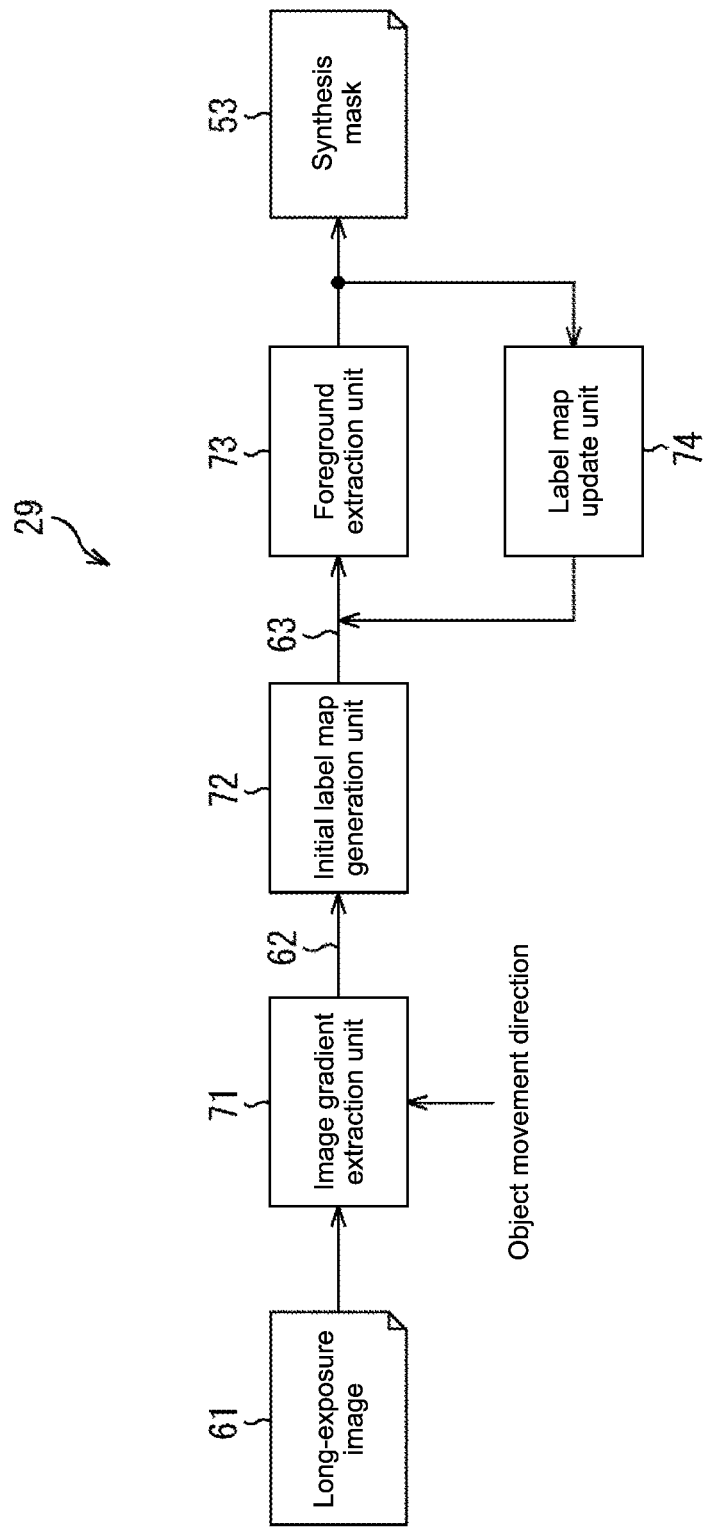
FIG. 3 A block diagram showing a structural example of a mask generation unit.

FIG. 3 is a block diagram showing a structural example of the mask generation unit.

The mask generation unit 29 includes an image gradient extraction unit 71, an initial label map generation unit 72, a foreground extraction unit 73, and a label map update unit 74.

As an input image, a positioned long-exposure image 61 is input to the image gradient extraction unit 71. When there is an object moving during photographing in the long-exposure image, the image gradient extraction unit 71 extracts image gradient components in the object movement direction indicating a direction of the movement of the object. The long-exposure image 61 is apt to be blurred by a stir of a camera, a stir of a hand, and the like. Therefore, even when there is a gradient in the same direction as the object in areas excluding the object, the intensity thereof is weakened, and therefore it becomes easier to extract the object area.

It should be noted that as the method of extracting a gradient, a difference between adjacent pixels may be obtained, or a gradient may be calculated as a gradient histogram of each local area as described in "Navneet Dslal et al., "Histogras of Oriented Gradients for Human Detection", Proc. CVPR, pp. 886-893, 2005" (hereinafter, referred to as Non-patent Document 1).

The image gradient extraction unit 71 supplies the extracted gradient extraction result 62 of the image to the initial label map generation unit 72.

Based on the gradient extraction result 62 from the image gradient extraction unit 71, the initial label map generation unit 72 generates an initial label map 63. The initial label map generation unit 72 allocates, when a specific-direction gradient intensity of each pixel or each local area is smaller than a preset threshold value, that pixel or local area to a background-determined area, and allocates, when the specific-direction gradient intensity of each pixel or local area is equal to or larger than the threshold value, that pixel or local area to an object-side undetermined area. Based on that result, the initial label map generation unit 72 generates the initial label map 63. The initial label map generation unit 72 supplies the long-exposure image 61 and the generated initial label map 63 to the foreground extraction unit 73.

Based on the label map 63 from the initial label map generation unit 72 or the label map update unit 74, the foreground extraction unit 73 extracts a foreground from the long-exposure image 61 and generates a synthesis mask 53. In addition, for raising object detection accuracy of the synthesis mask 53 generated by extracting a foreground based on the initial label map 63, the foreground extraction unit 73 repetitively extracts a foreground for a designated number of times. When not satisfying the designated number of times, the foreground extraction unit 73 supplies the long-exposure image 61 and the generated synthesis mask 53 to the label map update unit 74. When satisfying the designated number of times, the foreground extraction unit 73 outputs the synthesis mask 53 to the image synthesis processing unit 30.

Using the synthesis mask 53 and the long-exposure image 61, the label map update unit 74 updates the label map 63. The label map update unit 74 supplies the updated label map 63 to the foreground extraction unit 73.

It should be noted that in the foreground extraction unit 73, a foreground extraction algorithm is applied for specifying an object area in a pixel unit. The foreground extraction algorithm includes "Carsten Rother et al., "GrabCut-Interactive Foreground Extraction using Iterated Graph Cuts," Trans. ACM GRAPH, pp. 309-314, 2004" (hereinafter, referred to as Non-patent Document 2), "Yuri Boykov, et al., "Fast Approximate Energy Minimization via Graph Cuts," Trans. PAMI, 1999" (hereinafter, referred to as Non-patent Document 3), and the like.

Figure 4:
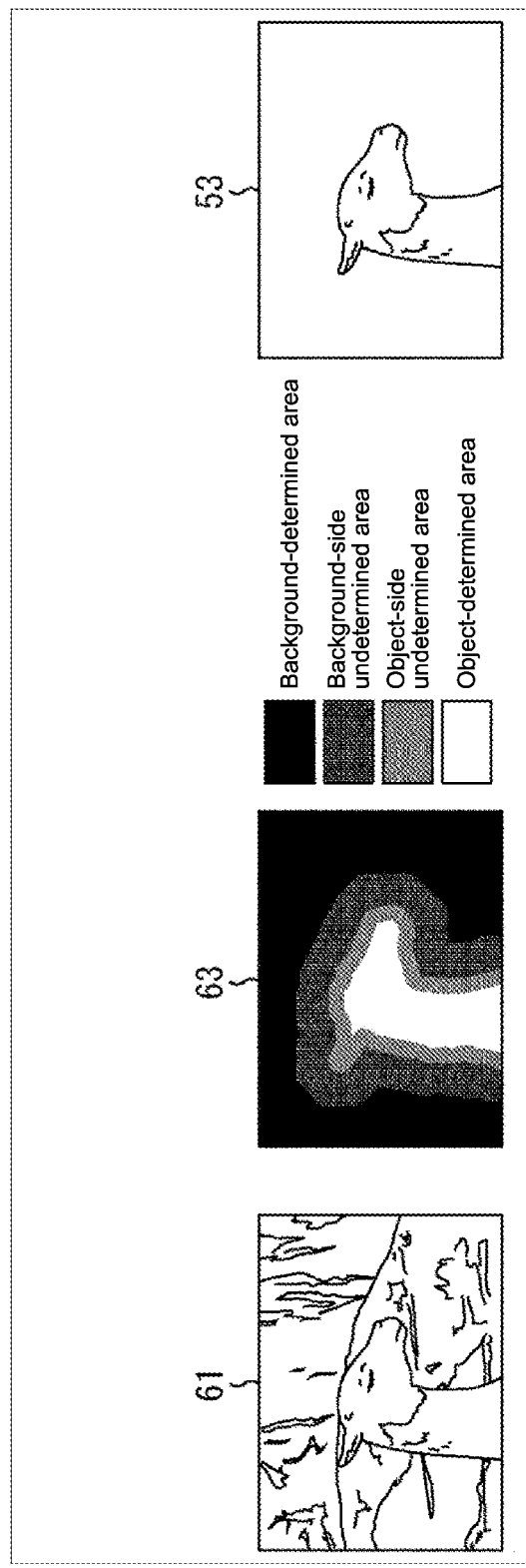
FIG. 4 A diagram for explaining a label map.

For extracting a foreground, the label map 63 shown in FIG. 4 is necessary. Normally, a user additionally creates a label map and supplies it, but in the present technique, the initial label map generation unit 72 and the label map update unit 74 generate and update the label map 63 based only on the object movement direction of the long-exposure image 61.

In the present technique, 4 types of labels including a background-determined area, a background-side undetermined area, an object-side undetermined area, and an object area are allocated in the object movement direction of the long-exposure image as shown in FIG. 4.

(Structural Example of Initial Label Map Generation Unit)

Figure 5:
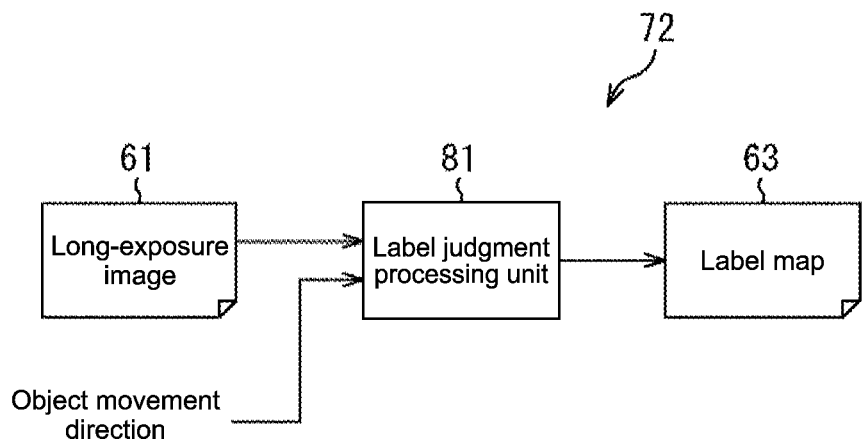
FIG. 5 A block diagram showing a structural example of an initial label map generation unit.

FIG. 5 is a block diagram showing a structural example of the initial label map generation unit.

In the example shown in FIG. 5, the initial label map generation unit 72 is structured to include a label judgment processing unit 81.

Figure 6:
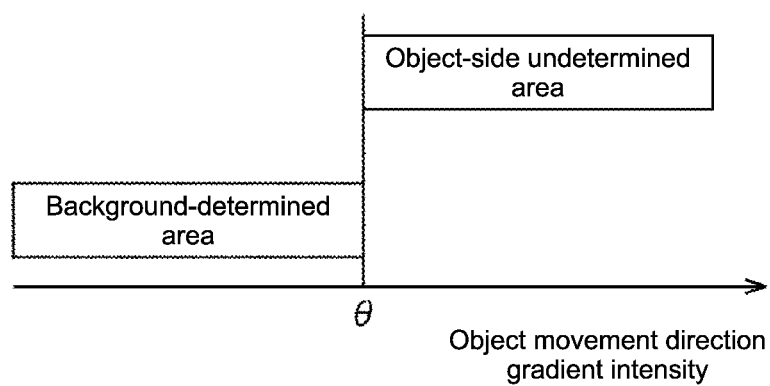
FIG. 6 A diagram for explaining label judgment.

The label judgment processing unit 81 allocates the labels using the long-exposure image 61 and the object movement direction. Specifically, as shown in FIG. 6, the label judgment processing unit 81 allocates, when an object movement direction gradient intensity of each pixel or each local area is smaller than a preset threshold value θ, that pixel or local area to the label of a background-determined area, and allocates, when the object movement direction gradient intensity of each pixel or local area is equal to or larger than the threshold value θ, that pixel or local area to the label of an object-side undetermined area. In the initial label map generation unit 72, the label map 63 is generated as described above.

(Structural Example of Label Map Update Unit)

Figure 7:
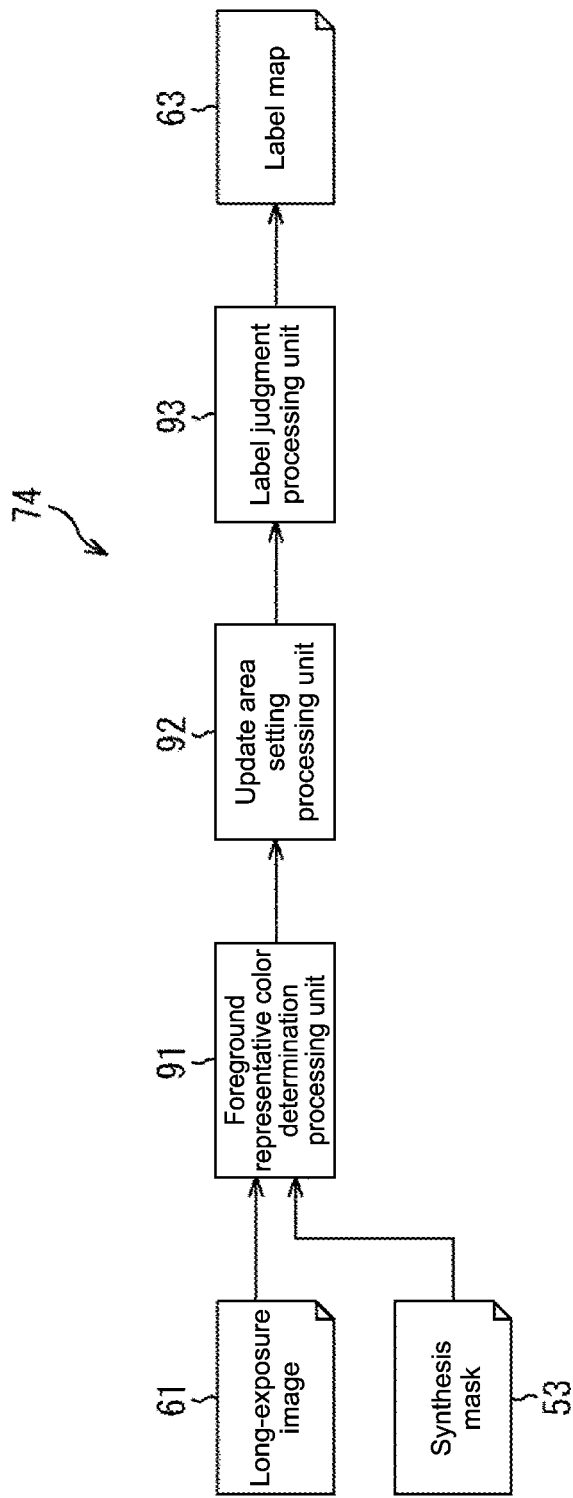
FIG. 7 A block diagram showing a structural example of a label map update unit.

FIG. 7 is a block diagram showing a structural example of the label map update unit.

In the example shown in FIG. 7, the label map update unit 74 is structured to include a foreground representative color determination processing unit 91, an update area setting processing unit 92, and a label judgment processing unit 93.

Using the long-exposure image 61 and the synthesis mask 53, the foreground representative color determination processing unit 91 calculates a color histogram in the foreground area of the synthesis mask 53 and determines a representative color. The foreground representative color determination processing unit 91 supplies the long-exposure image 61, the synthesis mask 53, and the representative color to the update area setting processing unit 92. The representative color may be a color component that appears most frequently, or may be a color component that appears at a certain level of frequency or more.

Figure 8:
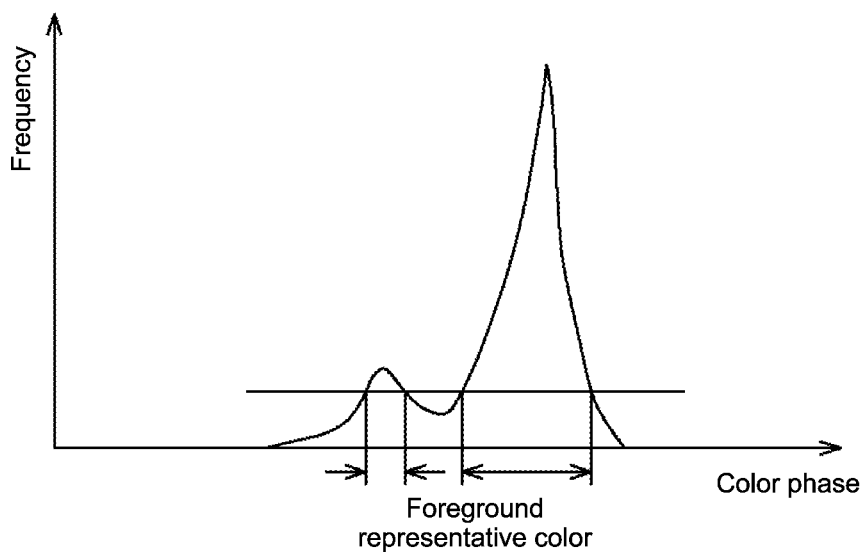
FIG. 8 A diagram showing a color phase histogram.

In the example shown in FIG. 8, a color phase histogram in the foreground area of the synthesis mask 53 is shown. It should be noted that although a color phase is used in the case of FIG. 8, luminance or other specific channels may be used instead.

Figure 9:
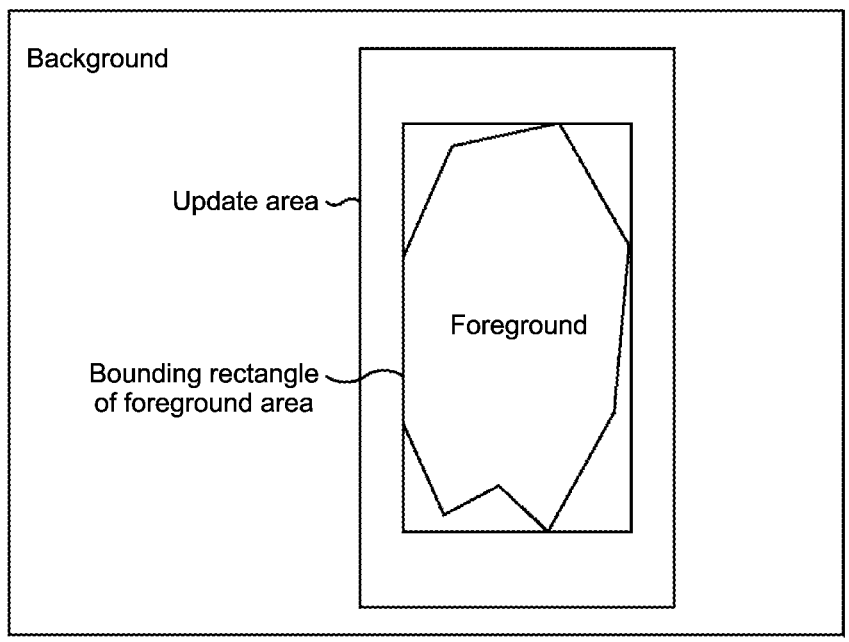
FIG. 9 A diagram for explaining an update area setting method.

The update area setting processing unit 92 sets an update area of the label map 63. Specifically, as shown in FIG. 9, the update area setting processing unit 92 sets an area obtained by longitudinally and laterally enlarging a bounding rectangle of the foreground area by a designated ratio, as the update area. The update area setting processing unit 92 supplies the long-exposure image 61, the synthesis mask 53, the representative color, and the update area to the label judgment processing unit 93.

The label judgment processing unit 93 updates the label map 63 of the long-exposure image 61 based on the synthesis mask 53, the representative color, and the update area.

(Example of Photographing Processing)

Next, photographing processing of the image pickup apparatus 11 in a slow shutter mode will be described while referring to the flowchart of FIG. 10. For example, it is assumed that in the image pickup apparatus 11, the method of the present technique is set as the slow shutter mode and a user has currently selected that mode.

For example, in Step S21, the CPU 33 of the image pickup apparatus 11 sets an object movement direction (i.e., specific direction) during exposure based on a user operation. For example, when photographing a waterfall that falls downwards on a screen, the vertical direction is set as the object movement direction. It should be noted that the object movement direction may be set automatically based on an image analysis or the like without requiring a user operation. For example, a direction of an image gradient component having a largest area in the image as a result of the image analysis is set as the object movement direction.

Next, in Step S22, the CPU 33 performs exposure settings including an exposure time, aperture, and ISO of the long-exposure image and short-exposure images based on a user operation. Those setting values may be set manually by the user or may be set automatically based on detection values.

In Step S23, based on a user operation such as releasing the shutter, the CPU 33 consecutively photographs images. Accordingly, light photographed by the optical system 21 is collected on the image pickup device 23 and output as image signals to the AFE unit 24. The AFE unit 24 adjusts image signals from the image pickup device 23, converts the signals into digital data, and supplies the data to the development processing unit 25.

In Step S24, the development processing unit 25 carries out camera signal processing such as de-mosaic processing on the image data from the AFE unit 24 and supplies the image data subjected to the camera signal processing to the positioning unit 28.

In Step S25, the positioning unit 28 positions the plurality of images from the development processing unit 25 and supplies the positioned image data to the mask generation unit 29 and the image synthesis processing unit 30.

In Step S26, the mask generation unit 29 uses the positioned long-exposure image to carry out mask generation processing. Details of the mask generation processing will be described later with reference to FIG. 11. By the mask generation processing, the synthesis mask 53 is generated and supplied to the image synthesis processing unit 30.

In Step S27, the image synthesis processing unit 30 uses the synthesis mask 53, the long-exposure image, and the short-exposure images to carry out image synthesis processing and generates a slow shutter image. The generated slow shutter image is supplied to the resolution conversion unit 26.

In Step S28, the resolution conversion unit 26, the codec unit 27, and the drive 36 carry out medium recording. Specifically, the resolution of the slow shutter image is converted by the resolution conversion unit 26, the image is encoded by the codec unit 27, and the encoded data is supplied to the drive 36. The drive 36 records the encoded data onto the removable recording medium 41.

Figure 10:
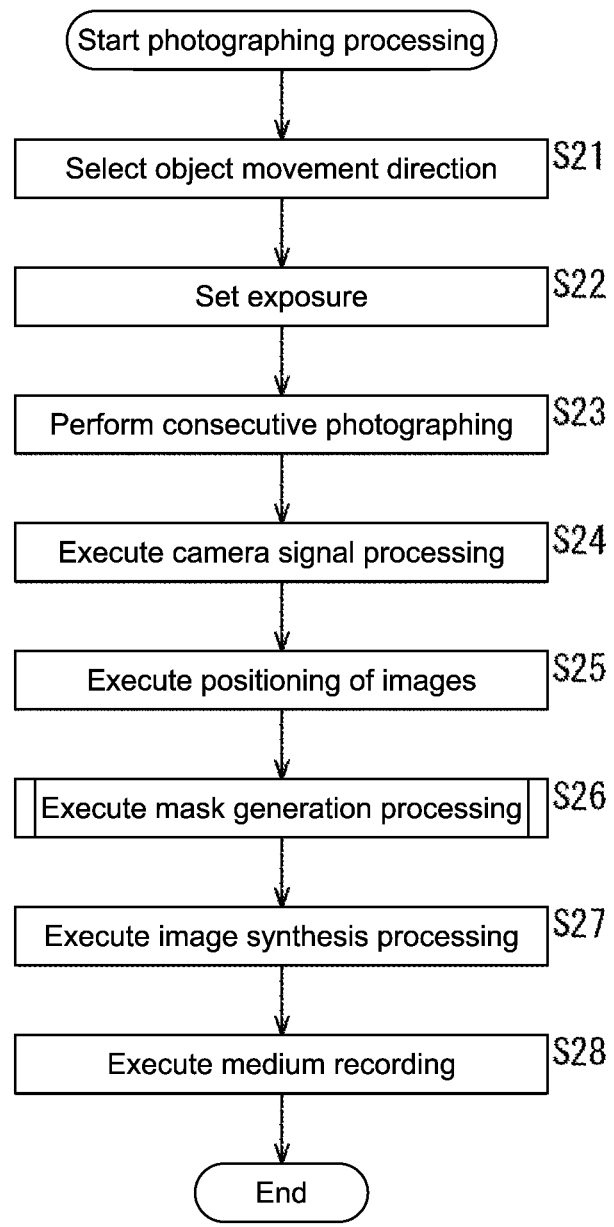
FIG. 10 A flowchart for explaining photographing processing in a slow shutter mode.

It should be noted that although the object movement direction is selected in Step S21 in the example shown in FIG. 10, the timing of selecting the object movement direction may be any timing from Steps S21 to S25 as long as it is before a mask is generated.

(Example of Mask Generation Processing)

Figure 11:
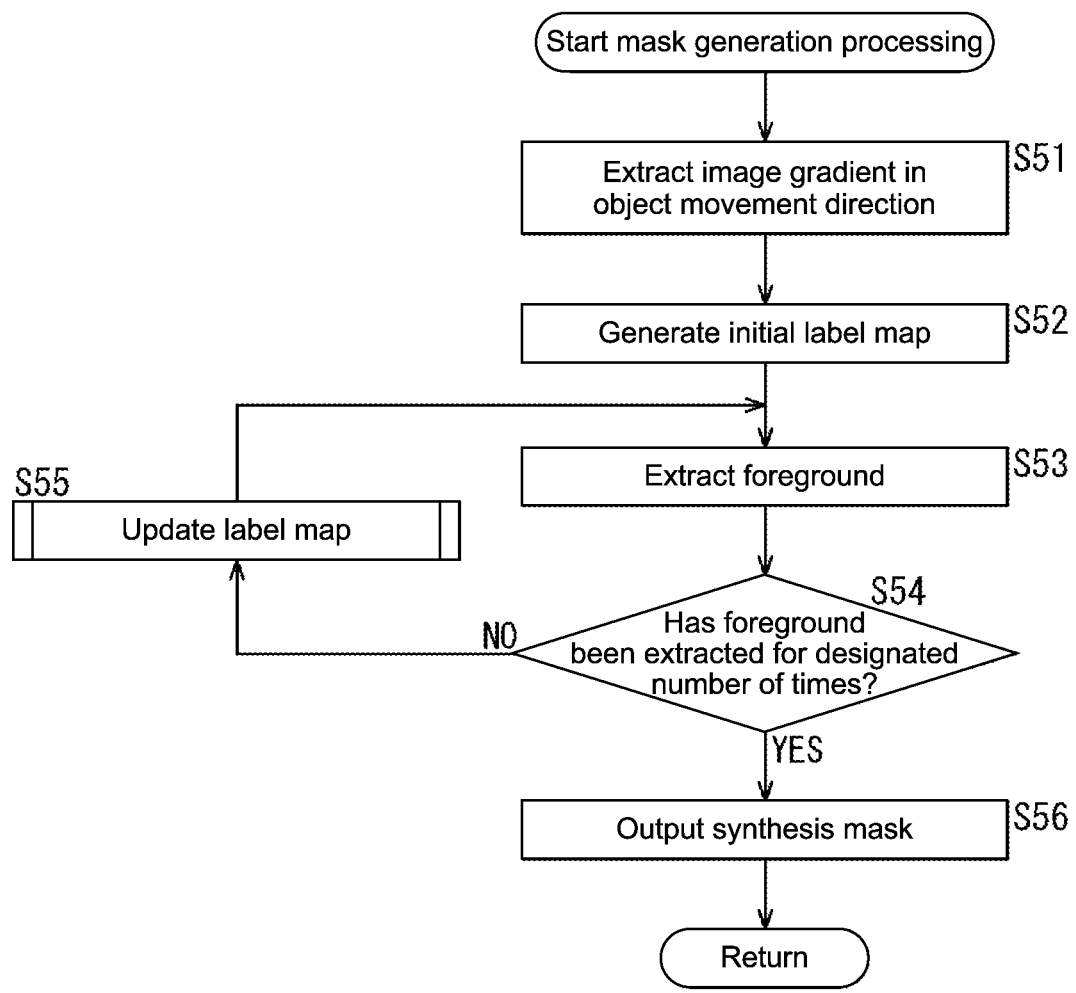
FIG. 11 A flowchart for explaining mask generation processing.

Next, the mask generation processing will be described while referring to the flowchart of FIG. 11.

In Step S51, the image gradient extraction unit 71 extracts an object movement direction image gradient from the long-exposure image 61. The image gradient extraction unit 71 supplies the extracted gradient extraction result 62 of the image to the initial label map generation unit 72.

In Step S52, the initial label map generation unit 72 generates an initial label map 63 based on the gradient extraction result 62 from the image gradient extraction unit 71. Specifically, as shown in FIG. 6, the initial label map generation unit 72 allocates, when a specific-direction gradient intensity of each pixel or each local area is smaller than a preset threshold value, that pixel or local area to the background-determined area, and allocates, when the specific-direction gradient intensity of each pixel or local area is equal to or larger than the threshold value, that pixel or local area to the object-side undetermined area. Based on that result, the initial label map generation unit 72 generates the initial label map 63. The initial label map generation unit 72 supplies the long-exposure image 61 and the generated initial label map 63 to the foreground extraction unit 73.

In Step S53, based on the label map from the initial label map generation unit 72 or the label map update unit 74, the foreground extraction unit 73 extracts a foreground from the long-exposure image 61 and generates a synthesis mask 53.

In Step S54, the foreground extraction unit 73 judges whether the foreground has been extracted a designated number of times, and when judged that the foreground has not been extracted a designated number of times, supplies the long-exposure image 61 and the generated synthesis mask 53 to the label map update unit 74. After that, the processing advances to Step S55.

In Step S55, the label map update unit 74 updates the label map 63 using the synthesis mask 53 and the long-exposure image 61. Details of the label map update processing will be described later with reference to FIG. 12. The label map is updated by the label map update processing, and the updated label map 63 is supplied to the foreground extraction unit 73. Then, the processing advances to Step S53.

When judged in Step S54 that the foreground has been extracted a designated number of times, the processing advances to Step S56. In Step S56, the foreground extraction unit 73 outputs the synthesis mask 53 to the image synthesis processing unit 30.

(Example of Label Map Update Processing)

Figure 12:
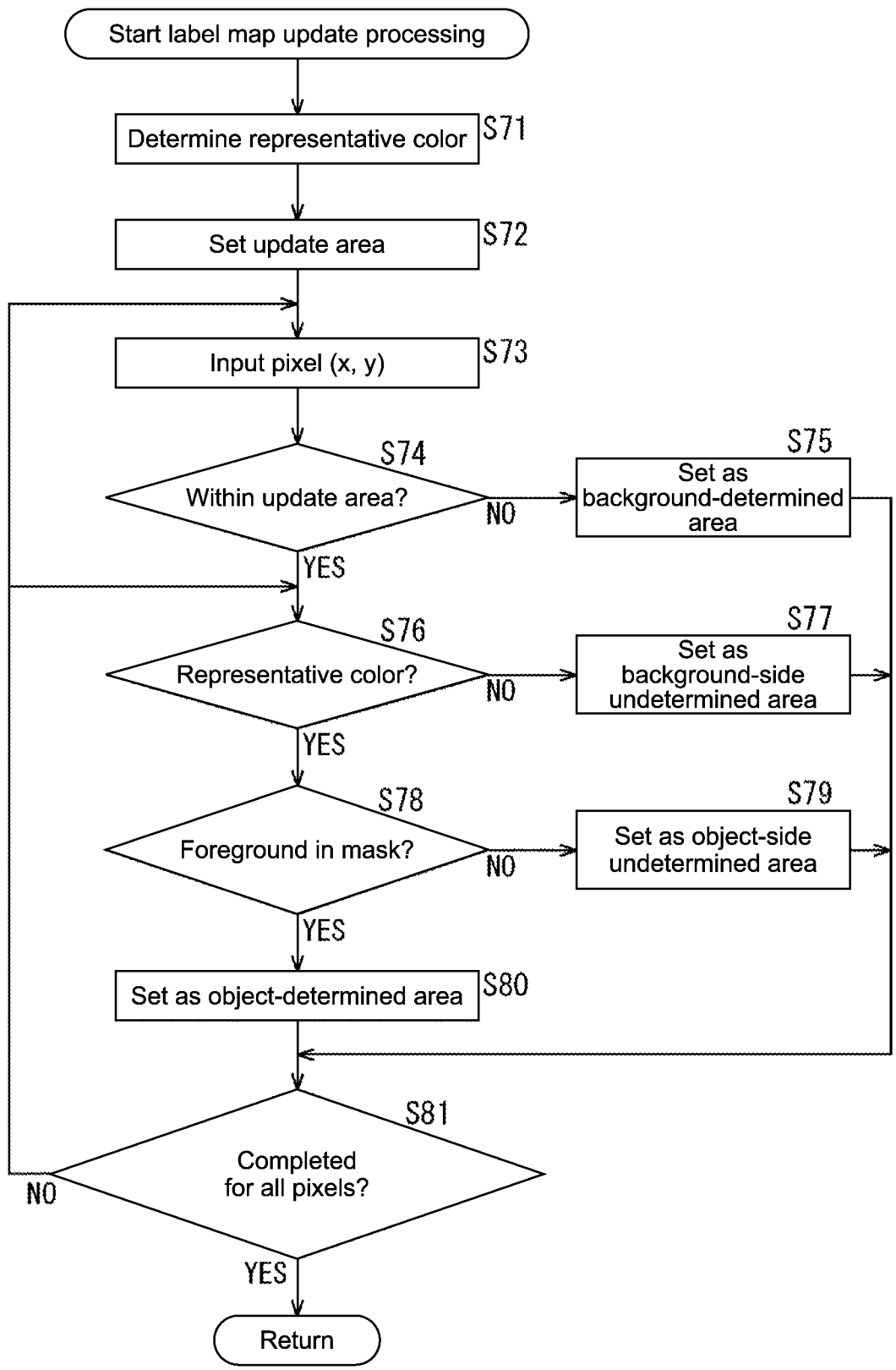
FIG. 12 A flowchart for explaining label map update processing.

Next, the label map update processing will be described while referring to the flowchart of FIG. 12.

In Step S71, using the long-exposure image 61 and the synthesis mask 53, the foreground representative color determination processing unit 91 calculates a color histogram in the foreground area of the synthesis mask 53 and determines a representative color. Then, the foreground representative color determination processing unit 91 supplies the long-exposure image 61, the synthesis mask 53, and the representative color to the update area setting processing unit 92.

In Step S72, as described above with reference to FIG. 9, the update area setting processing unit 92 sets an update area of the label map 63. The update area setting processing unit 92 supplies the long-exposure image 61, the synthesis mask 53, the representative color, and the update area to the label judgment processing unit 93.

It should be noted that the subsequent Steps S74 to S81 are processing carried out by the label judgment processing unit 93 in pixel units.

In Step S74, the label judgment processing unit 93 inputs a pixel (x, y) of the long-exposure image 61. In Step S74, the label judgment processing unit 93 judges whether the input pixel (x, y) is inside the update area. When judged in Step S74 that the input pixel (x, y) is outside the update area, the processing advances to Step S75. In Step S75, the label judgment processing unit 93 allocates the input pixel (x, y) to the background-determined area. After that, the processing advances to Step S81.

When judged in Step S74 that the input pixel (x, y) is inside the update area, the processing advances to Step S76. In Step S76, the label judgment processing unit 93 judges whether the input pixel (x, y) is a representative color. When judged in Step S76 that the input pixel (x, y) is not the representative color, the processing advances to Step S77. In Step S77, the label judgment processing unit 93 allocates the input pixel (x, y) to the background-side undetermined area. After that, the processing advances to Step S81.

When judged in Step S76 that the input pixel (x, y) is the representative color, the processing advances to Step S78. In Step 78, the label judgment processing unit 93 judges whether the input pixel (x, y) is a foreground in the synthesis mask 53.

When judged in Step S78 that the input pixel (x, y) is not the foreground in the synthesis mask 53, the processing advances to Step S79. In Step S79, the label judgment processing unit 93 allocates the input pixel (x, y) to the object-side undetermined area. After that, the processing advances to Step S81.

When judged in Step S78 that the input pixel (x, y) is the foreground in the synthesis mask 53, the processing advances to Step S80. In Step S80, the label judgment processing unit 93 allocates the input pixel (x, y) to the object area. After that, the processing advances to Step S81.

In Step S81, the label judgment processing unit 93 judges whether the processing has been completed for all pixels. When judged in Step S81 that the processing has not been completed for all pixels, the processing returns to Step S73, and the subsequent steps are repeated. When judged in Step S81 that the processing has been completed for all pixels, the label map update processing is ended, and the processing returns to Step S55 of FIG. 11.

(Object Movement Direction Selection UI)

Figure 13:
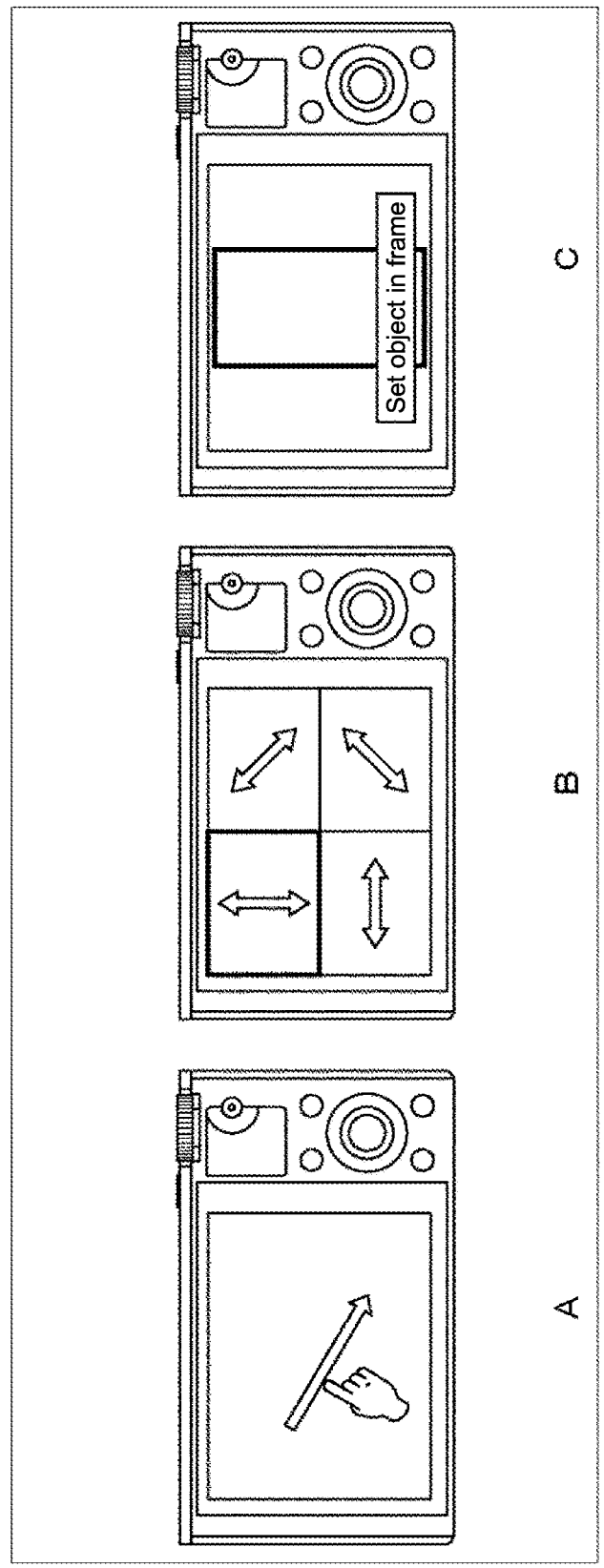
FIG. 13 Diagrams showing examples of a UI used for selecting an object movement direction.

FIGS. 13A to 13C are diagrams showing examples of a UI used for selecting the object movement direction. It should be noted that one of a plurality of images that have been photographed while changing the exposure time (favorably, long-exposure image) may be displayed on the screens shown in FIGS. 13A to 13C. This is because, when selecting a specific direction such as the object movement direction, the direction can be more easily selected while watching the long-exposure image.

When selecting the object movement direction as described above in Step S21 of FIG. 10, a user may select the object movement direction by an operation of sliding a finger in the object movement direction in the case where a display with which touch panel operations can be made is used, as shown in FIG. 13A.

Alternatively, as shown in FIG. 13B, several direction candidates may be displayed (presented) to prompt the user to select a desired direction. In the example shown in FIG. 13B, 4 directions are presented.

Alternatively, detection values, scene analysis, and the like may be adopted such that, after a frame is set as shown in FIG. 13C and a user moves the frame or image such that an image of a flow (object) to be photographed fits in the frame based on a user operation, the CPU 33 judges the object movement direction based on a pixel gradient direction in the frame.

With the structure described above, the present technique bears the following effects.

(Example of Image)

Figure 14:
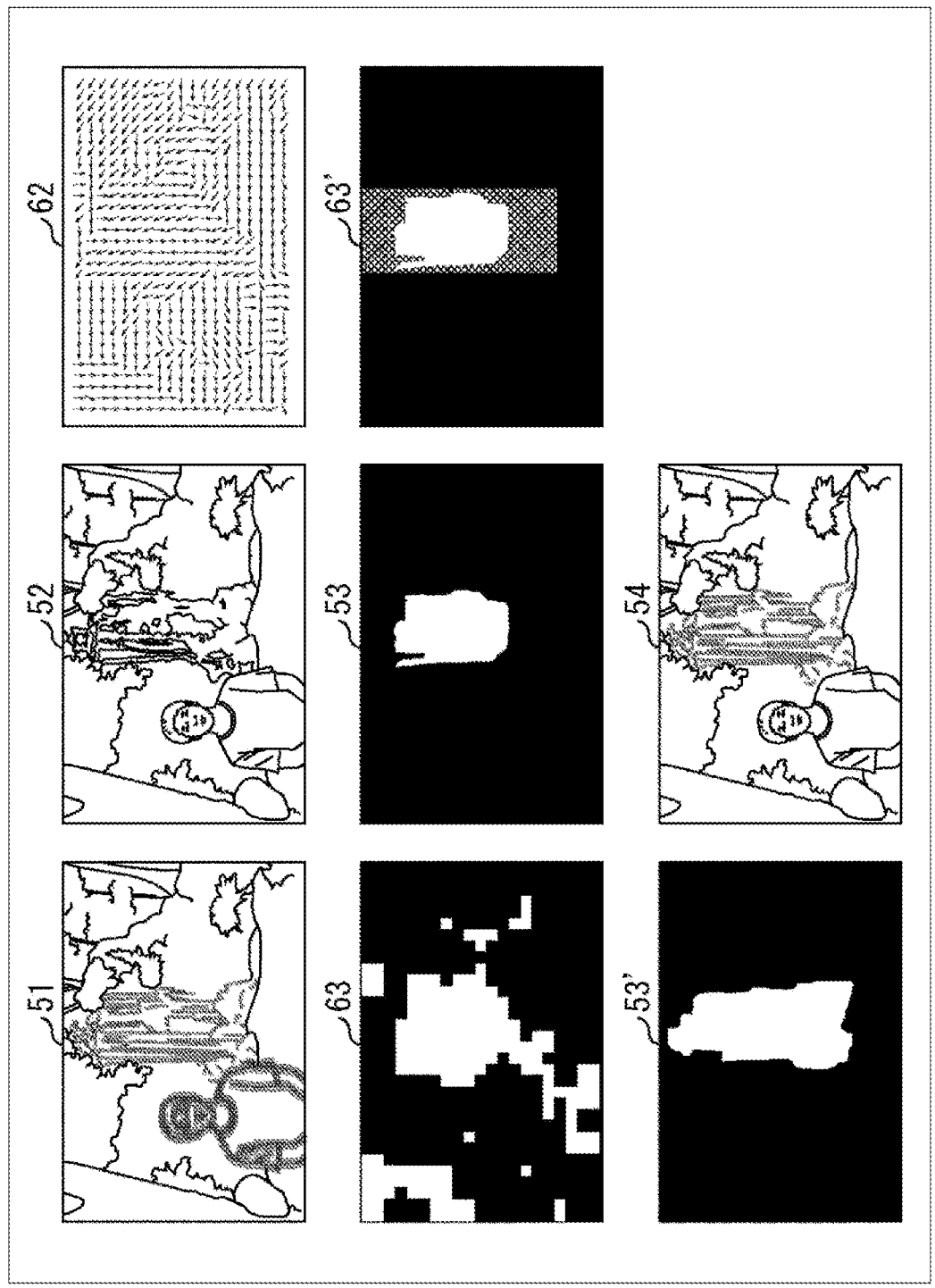
FIG. 14 A diagram for explaining an example of an image obtained by the present disclosure.

FIG. 14 is a diagram for explaining an example of an image obtained by the present technique.

Here, descriptions will be given using two images (long-exposure image 51 and short-exposure image 52). It should be noted that in the image pickup apparatus 11, the object movement direction is set in the vertical direction, and the number of times a foreground is extracted is set to twice.

In the long-exposure image 51, water flows are expressed as a waterfall as intended by the slow shutter. However, the image gives a blurry impression as a whole due to an influence of a stir of a hand. On the other hand, while a person appears clearly on the left-hand side in the consecutively-photographed short-exposure image 52, the flow of the waterfall is stopped.

The image gradient extraction unit 71 extracts image gradient components in the object movement direction from the long-exposure image 51 and obtains a gradient extraction result 62 of the long-exposure image 51. In the gradient extraction result 62, the directions and sizes of the gradients are indicated by arrows, for example.

The initial label map 63 is obtained by the initial label map generation unit 72 carrying out a threshold value judgment on the gradients in the vertical direction based on the gradient extraction result 62. By extracting a foreground with respect to the initial label map 63, the synthesis mask 53 is obtained.

Further, using the synthesis mask 53 and the long-exposure image 51, the label map 63 is updated to generate a label map 63'. By further extracting a foreground from the label map 63', a synthesis mask 53' is obtained.

Using the synthesis mask 53' generated by the present technique as described above, the long-exposure image 51 and the short-exposure image 52 are synthesized to eventually obtain an output image 54 in slow shutter photographing.

By using the synthesis mask 53' generated from the long-exposure image 51 in the output image 54, an image in which the background area is static and only the waterfall is falling can be obtained. Furthermore, although the long-exposure image 51 gives a blurry impression due to a movement of a person during exposure, according to the present technique, by replacing the image excluding the flowing object by the short-exposure image 52, only the flowing object to be photographed can be made to flow, and other dynamic bodies can be made static. As a result, for example, it becomes possible to perform photographing in a difficult composition, such as taking a ceremonial photograph with a flowing or moving object.

The present technique is also applicable to a case of photographing a physical object that moves in a specific direction in slow shutter, such as in a vehicle or a merry-go-round in an amusement park.

It should be noted that the descriptions above have been given on the example of the photographing processing of the image pickup apparatus 11. However, the processing of the present technique can also be carried out when reproducing an image in which a long-exposure image and short-exposure images are consecutively exposed and recorded.

(Example of Reproduction Processing)

Figure 15:
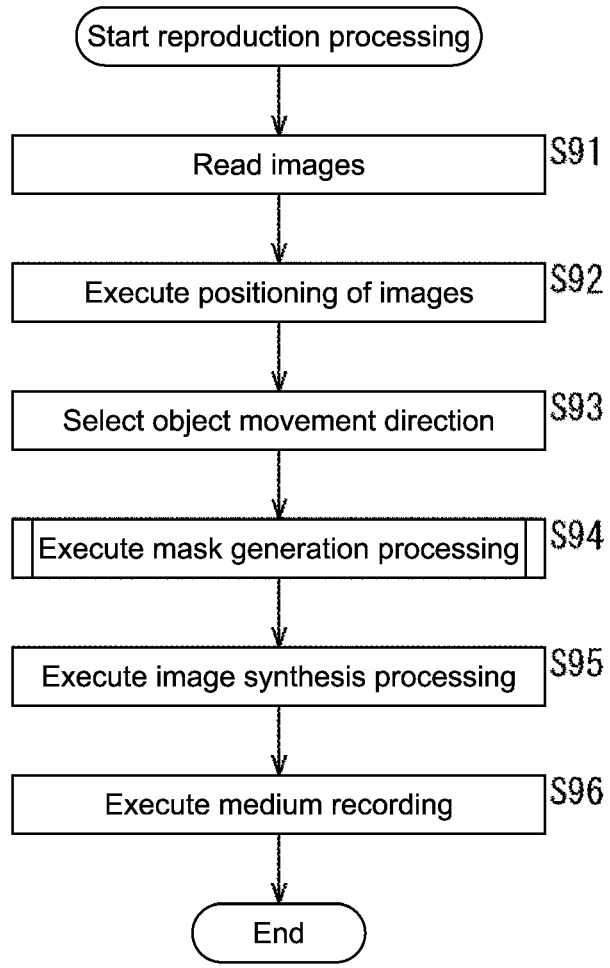
FIG. 15 A flowchart for explaining reproduction processing.

Next, while referring to the flowchart of FIG. 15, reproduction processing carried out by the image pickup apparatus 11 will be described. For example, it is assumed that in the image pickup apparatus 11, the long-exposure image and short-exposure images are exposed consecutively and recorded onto the removable recording medium 41 or the like.

For example, based on a user operation, the CPU 33 of the image pickup apparatus 11 controls the drive 36 to read images (long-exposure image 51 and short-exposure images 52) recorded onto the removable recording medium 41 in Step S91. The drive 36 reads out encoded data from the removable recording medium 41 and supplies the data to the codec unit 27. The codec unit 27 decodes the encoded data read out by the drive 36 and supplies image data obtained as a result of the decode to the positioning unit 28.

In Step S92, the positioning unit 28 performs positioning among the plurality of images from the codec unit 27 and supplies positioned image data to the mask generation unit 29 and the image synthesis processing unit 30.

For example, based on a user operation, the CPU 33 sets an object movement direction during exposure in Step S93. For example, when photographing a waterfall falling downwards from a top of a screen, the vertical direction is set as the object movement direction.

In Step S94, the mask generation unit 29 carries out mask generation processing using the positioned long-exposure image. Details of the mask generation processing are the same as those of the processing described above with reference to FIG. 11, so descriptions thereof will be omitted. The synthesis mask 53 is generated by the mask generation processing and supplied to the image synthesis processing unit 30.

In Step S95, using the synthesis mask 53, the long-exposure image, and the short-exposure images, the image synthesis processing unit 30 carries out image synthesis processing and generates a slow shutter image. The generated slow shutter image is supplied to the resolution conversion unit 26.

In Step S96, the resolution conversion unit 26, the codec unit 27, and the drive 36 carry out medium recording. Specifically, the resolution of the slow shutter image is converted by the resolution conversion unit 26, the image is encoded by the codec unit 27, and the encoded data is supplied to the drive 36. The drive 36 records the encoded data onto the removable recording medium 41.

As described above, when consecutively-photographed long-exposure image and short-exposure images are recorded in advance, the processing of the present technique can be carried out during reproduction.

(Another Functional Structural Example of Image Pickup Apparatus)

Figure 16:
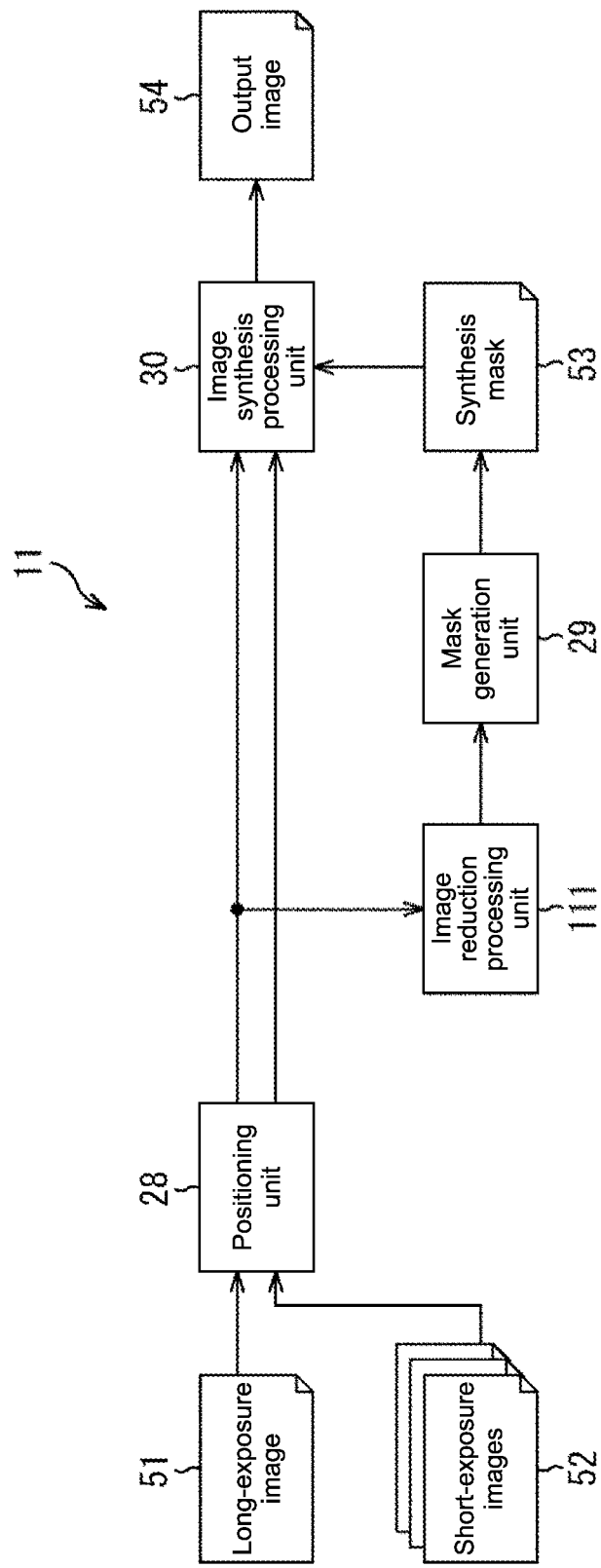
FIG. 16 A block diagram showing another functional structural example of the image pickup apparatus.

FIG. 16 shows another functional structural example of the image pickup apparatus.

The image pickup apparatus 11 shown in FIG. 16 is the same as that shown in FIG. 2 in that it includes the positioning unit 28, the mask generation unit 29, and the image synthesis processing unit 30. The image pickup apparatus 11 shown in FIG. 16 is different from that shown in FIG. 2 in that an image reduction processing unit 111 is added before the mask generation unit 29.

The positioning unit 28 supplies the positioned long-exposure image 51 and short-exposure images 52 to the image synthesis processing unit 30. The positioning unit 28 also supplies the positioned long-exposure image 51 to the image reduction processing unit 111.

The image reduction processing unit 111 reduces a size of the positioned long-exposure image 51 and supplies the reduced long-exposure image 51 to the mask generation unit 29.

The mask generation unit 29 generates a synthesis mask 53 using the long-exposure image 51 that has been reduced after positioning.

(Example of Photographing Processing)

Figure 17:
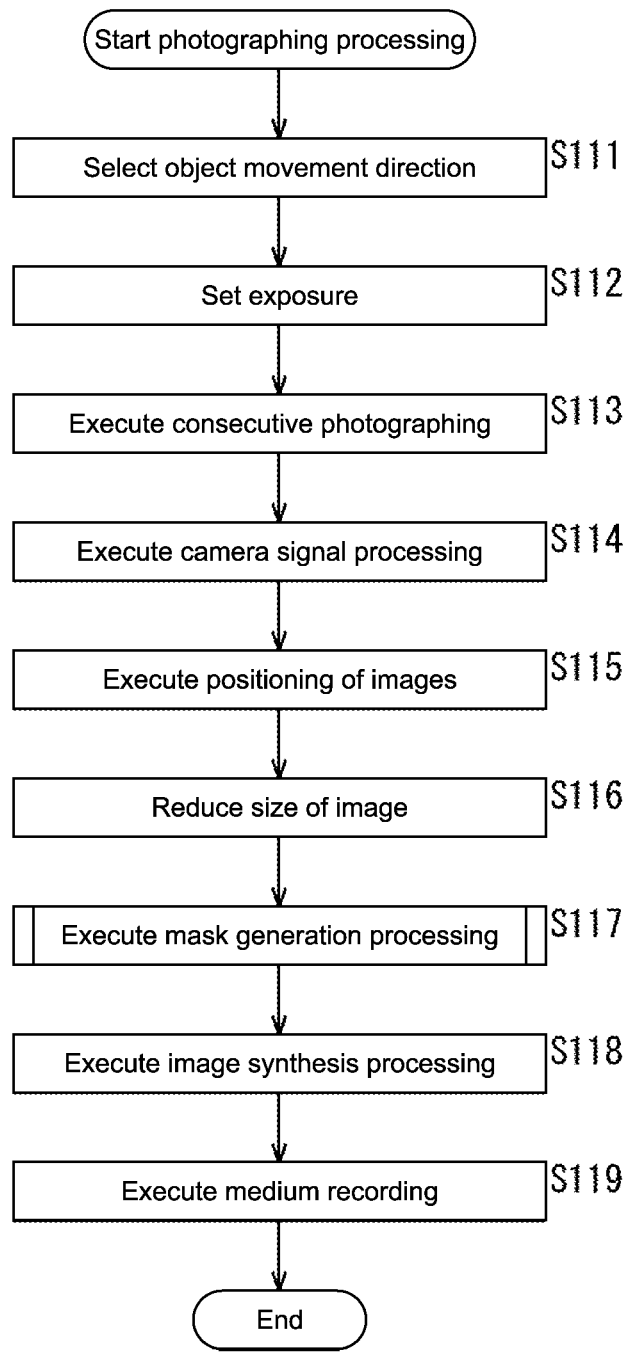
FIG. 17 A flowchart for explaining photographing processing in the slow shutter mode.

Next, while referring to the flowchart of FIG. 17, the photographing processing carried out by the image pickup apparatus 11 in the slow shutter mode will be described. It should be noted that Steps S111 to S115 and Steps S117 to S119 of FIG. 17 are basically similar to Steps S21 to S28 of FIG. 10. Therefore, descriptions thereof will be omitted.

After Step S115, the positioning unit 28 supplies the positioned long-exposure image 51 to the image reduction processing unit 111.

In Step S116, the image reduction processing unit 111 reduces the size of the positioned long-exposure image 51 and supplies the reduced long-exposure image 51 to the mask generation unit 29.

In Step S117, the mask generation unit 29 carries out mask generation processing using the long-exposure image 51 that has been reduced after positioning.

As described above, by using a reduced image for generating a mask, the processing speed can be raised.

The series of processing described above can be executed either by hardware or software. When the series of processing is executed by software, programs constituting the software are installed in a computer. The computer used herein includes a computer into which dedicated hardware is incorporated and a general-purpose personal computer that is capable of executing various functions by installing various programs.

2. Second Embodiment (Structural Example of Computer)

Figure 18:
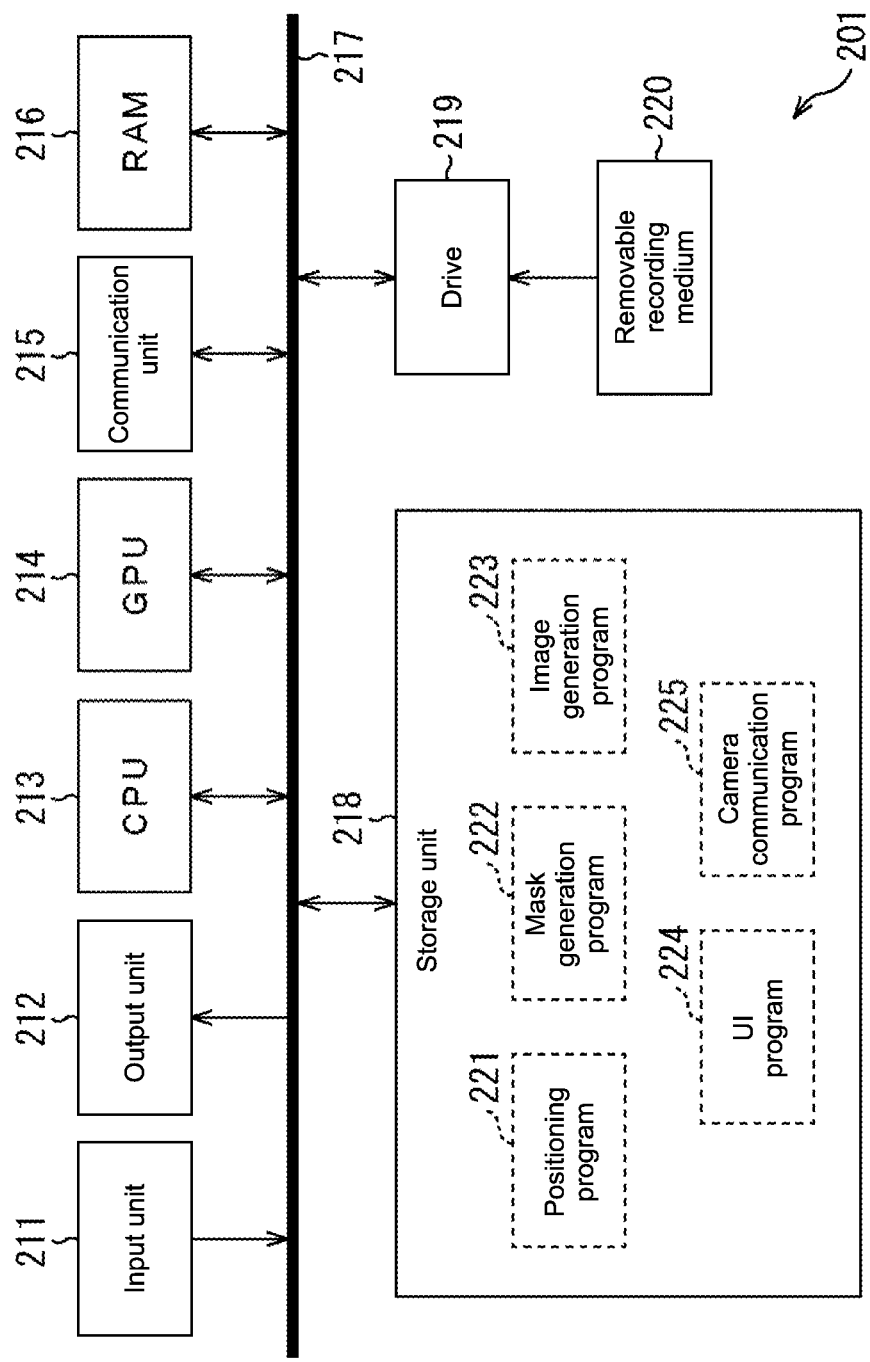
FIG. 18 A block diagram showing a structural example of a computer.

FIG. 18 shows a structural example of hardware of a computer that executes the series of programs described above by executing programs. Specifically, FIG. 18 shows a structural example of a case where the image pickup system and the processing system are independent from each other.

In a computer 201, an input unit 211, an output unit 212, a CPU (Central Processing Unit) 213, a GPU (Graphics Processing Unit) 214, a communication unit 215, and a RAM 216 are mutually connected via a bus 217.

Further connected to the bus 217 are a storage unit 218 and a drive 219.

The input unit 211 is constituted of a keyboard, a mouse, a microphone, and the like. The output unit 212 is constituted of a display, a speaker, and the like. The GPU 214 carries out calculation processing requisite for displaying 3D graphics. The communication unit 215 is constituted of a network interface and the like. The storage unit 218 is constituted of a hard disk, a nonvolatile memory, and the like. The drive 219 drives a removable recording medium 220 such as a magnetic disk, an optical disc, a magneto-optical disc, and a semiconductor memory.

In the computer structured as described above, for example, the CPU 213 loads and executes the programs stored in the storage unit 218, in the RAM 216 via the bus 217. As a result, the series of processing described above is carried out.

For example, the storage unit 218 stores a positioning program 221, a mask generation program 222, an image generation program 223, a UI program 224, and a camera communication program 225.

The positioning program 221 basically carries out the same processing as the storage unit 218 shown in FIG. 1. The mask generation program 222 basically carries out the same processing as the mask generation unit 29 shown in FIG. 1. The image generation program 223 basically carries out the same processing as the image synthesis processing unit 30 shown in FIG. 1. The UI program 224 executes display control related to UIs. The camera communication program 225 communicates with an apparatus of the image pickup system (not shown).

The programs to be executed by the computer (CPU 213) can be provided by being recorded onto the removable recording medium 220 as a package medium, for example. Alternatively, the programs can be provided via a wired or wireless transmission medium such as a local area network, the Internet, and digital satellite broadcast.

In the computer, by loading the removable recording medium 220 in the drive 219, the programs can be installed in the storage unit 218 via the bus 217. Alternatively, the programs can be received by the communication unit 215 via a wired or wireless transmission medium and installed in the storage unit 218. Alternatively, the programs can be installed in advance in a ROM (not shown) or the storage unit 218.

It should be noted that the programs to be executed by the computer may be programs that carry out the processing in time series in the order in which the descriptions are given in the specification, or may be programs that execute the processing in parallel or at necessary timings when invoked or the like.

As described above, the present technique is not limited to the image processing apparatus and is also applicable to an image pickup apparatus, a server, and the like.

It should be noted that in the specification, the steps describing the series of processing include not only processing carried out in time series in the stated order but also processing carried out in parallel or independently and do not need to be processed in time series.

For example, the present technique may have a cloud computing structure that divisionally and cooperatively processes one function by a plurality of apparatuses via a network.

The embodiment of the present disclosure is not limited to the embodiments described above and can be variously modified without departing from the gist of the present disclosure.

Further, the steps of the flowcharts described above can be assigned to and executed by a plurality of apparatuses instead of executing the steps by a single apparatus.

Furthermore, when a single step includes a plurality of processing, the plurality of processing included in the single step can be assigned to and executed by a plurality of apparatuses instead of executing the processing by a single apparatus.

Moreover, the structure described above as a single apparatus (or processing unit) may be divided so as to be structured as a plurality of apparatuses (or processing units). Conversely, the structures described above as a plurality of apparatuses (or processing units) may be combined to be structured as a single apparatus (or processing unit). Further, structures other than those described above may of course be added to the structure of each apparatus (or each processing unit). Furthermore, as long as the structures and operations as the entire system are substantially the same, a part of a structure of a certain apparatus (or processing unit) may be included in a structure of another apparatus (or another processing unit). In other words, the present technique is not limited to the embodiments described above and can be variously modified without departing from the gist of the present technique.

Heretofore, the favorable embodiments of the present disclosure have been specifically described with reference to the accompanying drawings. However, the present disclosure is not limited to those examples. It should be understood by those skilled in the art that various modifications, combinations, sub-combinations and alterations may occur depending on design requirements and other factors insofar as they are within the scope of the appended claims or the equivalents thereof.

It should be noted that the present technique may also take the following structures.

(1) An image processing apparatus, including:
  a mask generation unit that generates a synthesis mask based on information on a specific direction of a long-exposure image out of a plurality of consecutively-photographed images having different exposure times; and
  an image synthesis unit that synthesizes the plurality of images using the synthesis mask generated by the mask generation unit.

(2) The image processing apparatus according to (1) above,
  in which the information on a specific direction of a long-exposure image is set based on an object movement direction in the long-exposure image.

(3) The image processing apparatus according to (1) or (2) above,
  in which the mask generation unit includes
    a label map generation unit that generates an initial label map of the synthesis mask based on a gradient intensity of the long-exposure image in the specific direction, and
    a foreground extraction unit that extracts a foreground based on the initial label map generated by the label map generation unit and generates the synthesis mask.

(4) The image processing apparatus according to (3) above, in which
  the mask generation unit further includes a label map update unit that updates the initial label map based on at least one of a representative color and update area in the foreground of the synthesis mask, and
  the foreground extraction unit extracts the foreground based on the label map updated by the label map update unit and generates the synthesis mask.

(5) The image processing apparatus according to any one of (1) to (4) above, further including
  a display control unit that controls display of a UI (User Interface) for setting a specific direction of the long-exposure image.

(6) The image processing apparatus according to (5) above,
  in which one of the plurality of images is displayed on a screen.

(7) The image processing apparatus according to (6) above,
  in which the one of the plurality of images is a long-exposure image.

(8) The image processing apparatus according to (5) above,
  in which the display control unit controls display of the UI for setting a specific direction of the long-exposure image based on a user instruction on an object movement direction in the plurality of images.

(9) The image processing apparatus according to (5) above,
  in which the display control unit controls display of the UI for setting a specific direction of the long-exposure image based on a user selection from object movement direction candidates in the plurality of images.

(10) The image processing apparatus according to (5) above,
  in which the display control unit controls display of the UI for setting a specific direction of the long-exposure image by displaying an area for detecting an object movement direction in the plurality of images.

[11] The image processing apparatus according to any one of (1) to (10) above, further including
  a positioning unit that positions the plurality of images, in which
  the mask generation unit generates the synthesis mask based on gradient information of the long-exposure image positioned by the positioning unit, and
  the image synthesis unit synthesizes the plurality of images positioned by the positioning unit using the synthesis mask generated by the mask generation unit.

(12) An image processing method, including:
  generating, by an image processing apparatus, a synthesis mask based on information on a specific direction of a long-exposure image out of a plurality of consecutively-photographed images having different exposure times; and
  synthesizing, by the image processing apparatus, the plurality of images using the generated synthesis mask.

(13) A program that causes a computer to function as:
  a mask generation unit that generates a synthesis mask based on information on a specific direction of a long-exposure image out of a plurality of consecutively-photographed images having different exposure times; and
  an image synthesis unit that synthesizes the plurality of images using the synthesis mask generated by the mask generation unit.

DESCRIPTION OF REFERENCE NUMERALS 11 image pickup apparatus
21 optical system
22 drive unit
23 image pickup device
24 AFE unit
25 development processing unit
26 resolution conversion unit
27 codec unit
28 positioning unit
29 mask generation unit
30 image synthesis processing unit
31 bus
32 RAM
33 CPU
34 GPU
35 various sensors
36 drive
37 display
41 removable recording medium
51 long-exposure image
52 short-exposure image
53 synthesis mask
54 output image
61 long-exposure image
62 gradient extraction result
63 label map
71 image gradient extraction unit
72 initial label map generation unit
73 foreground extraction unit
74 label map update unit
81 label judgment processing unit 91 foreground representative color determination processing unit
92 update area setting processing unit
93 label judgment processing unit
111 image reduction processing unit
201 computer
221 positioning program
222 mask generation program
223 image generation program
224 UI program
225 camera communication program

The invention claimed is:

1. An image processing apparatus, comprising:
a display screen; and
circuitry configured to:
control the display screen to display a frame and a long-exposure image of a plurality of consecutively-photographed images;
determine a movement direction of an object in the long-exposure image based on the displayed frame;
extract image gradient information of the long-exposure image, wherein the image gradient information indicates image gradient components in the movement direction of the object in the long-exposure image;
generate a first synthesis mask based on the extracted image gradient information, wherein the plurality of consecutively-photographed images have different exposure times;
synthesize the plurality of consecutively-photographed images based on the generated first synthesis mask;
generate an output image based on the synthesis of the plurality of the consecutively-photographed images; and
control the display screen to display the output image.

2. The image processing apparatus according to claim 1, wherein the circuitry is further configured to:
generate an initial label map of the first synthesis mask based on a gradient intensity of the long-exposure image, wherein the gradient intensity is in the movement direction of the object;
extract a first foreground based on the initial label map; and
generate the first synthesis mask based on the extraction of the first foreground.

3. The image processing apparatus according to claim 2, wherein the circuitry is further configured to:
update the initial label map based on at least one of a representative color or an update area, wherein each of the representative color and the update area corresponds to the first foreground of the first synthesis mask;
extract a second foreground based on the updated initial label map; and
generate a second synthesis mask based on the extraction of the second foreground.

4. The image processing apparatus according to claim 2, wherein the circuitry is further configured to:
control the display screen to display a UI (User Interface); and
set a specific direction as the movement direction of the object in the long-exposure image based on the display of the UI.

5. The image processing apparatus according to claim 4, wherein the circuitry is further configured to set the specific direction as the movement direction of the object in the long-exposure image based on a user operation in the movement direction of the object in the long-exposure image.

6. The image processing apparatus according to claim 4, wherein the circuitry is further configured to set the specific direction as the movement direction of the object in the long-exposure image based on a user selection from object movement direction candidates in the plurality of consecutively-photographed images.

7. The image processing apparatus according to claim 1, wherein the circuitry is further configured to:
position each of the plurality of consecutively-photographed images; and
generate the first synthesis mask based on the image gradient information of the positioned long-exposure image.

8. An image processing method, comprising:
in an image processing apparatus that includes a display screen and circuitry:
controlling, by the circuitry, the display screen to display a frame and a long-exposure image of a plurality of consecutively-photographed images;
determining, by the circuitry, a movement direction of an object in the long-exposure image based on the displayed frame;
extracting, by the circuitry, image gradient information of the long-exposure image, wherein the image gradient information indicates image gradient components in the movement direction of the object in the long-exposure image;
generating, by the circuitry, a synthesis mask based on the extracted image gradient information, wherein the plurality of consecutively-photographed images have different exposure times;
synthesizing, by the circuitry, the plurality of consecutively-photographed images based on the generated synthesis mask;
generating, by the circuitry, an output image based on the synthesis of the plurality of the consecutively-photographed images; and
controlling, by the circuitry, the display screen to display the output image.

9. A non-transitory computer-readable medium having stored thereon computer-executable instructions that, when executed by a processor, cause the processor to execute operations, the operations comprising:
controlling a display screen to display a frame and a long-exposure image of a plurality of consecutively-photographed images;
determining a movement direction of an object in the long-exposure image based on the displayed frame;
extracting image gradient information of the long-exposure image, wherein the image gradient information indicates image gradient components in the movement direction of the object in the long-exposure image;
generating a synthesis mask based on the extracted image gradient information, wherein the plurality of consecutively-photographed images have different exposure times;
synthesizing the plurality of consecutively-photographed images based on the generated synthesis mask;
generating an output image based on the synthesis of the plurality of the consecutively-photographed images; and
controlling the display screen to display the output image.

* * * * *